Sept. 24, 1957  J. D. LESLIE ET AL  2,807,201
VEHICLE BODY WITH BUILT-IN VENTILATION SYSTEM
Filed Nov. 18, 1953  3 Sheets-Sheet 1
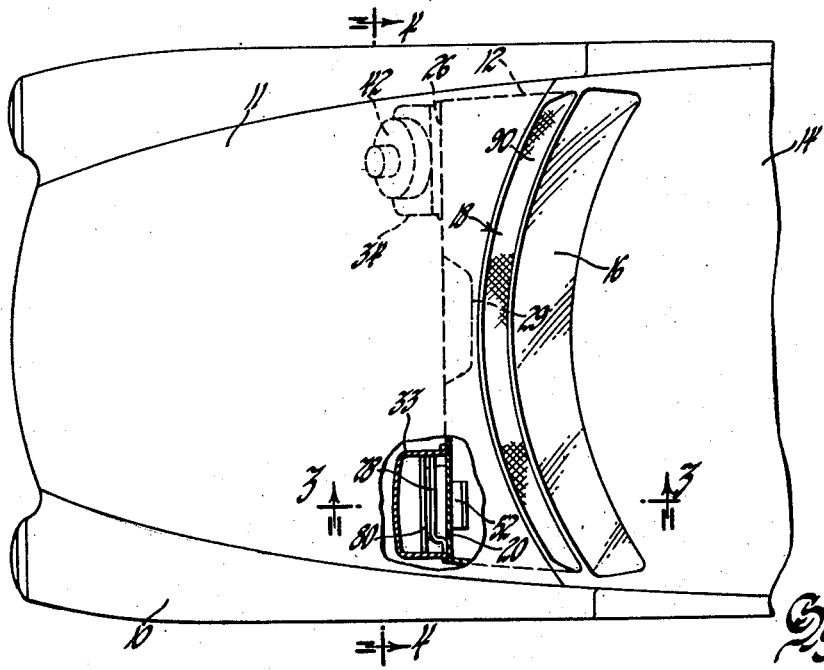
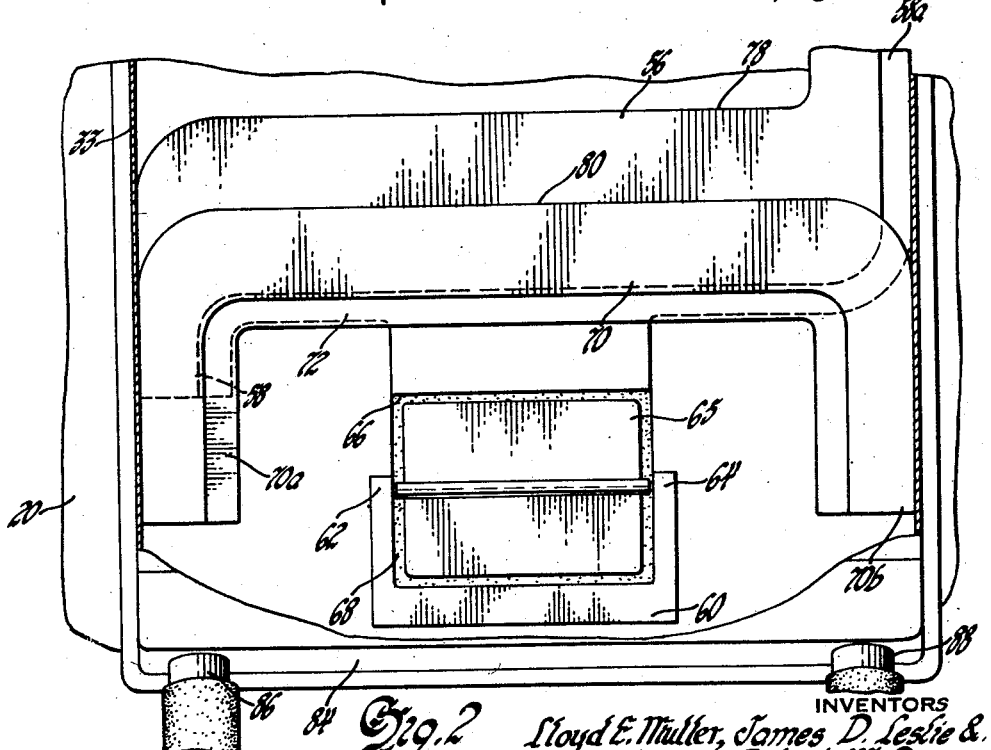
INVENTORS
Lloyd E. Muller, James D. Leslie &
BY Robert M. Fox
C. H. Ribble
ATTORNEY

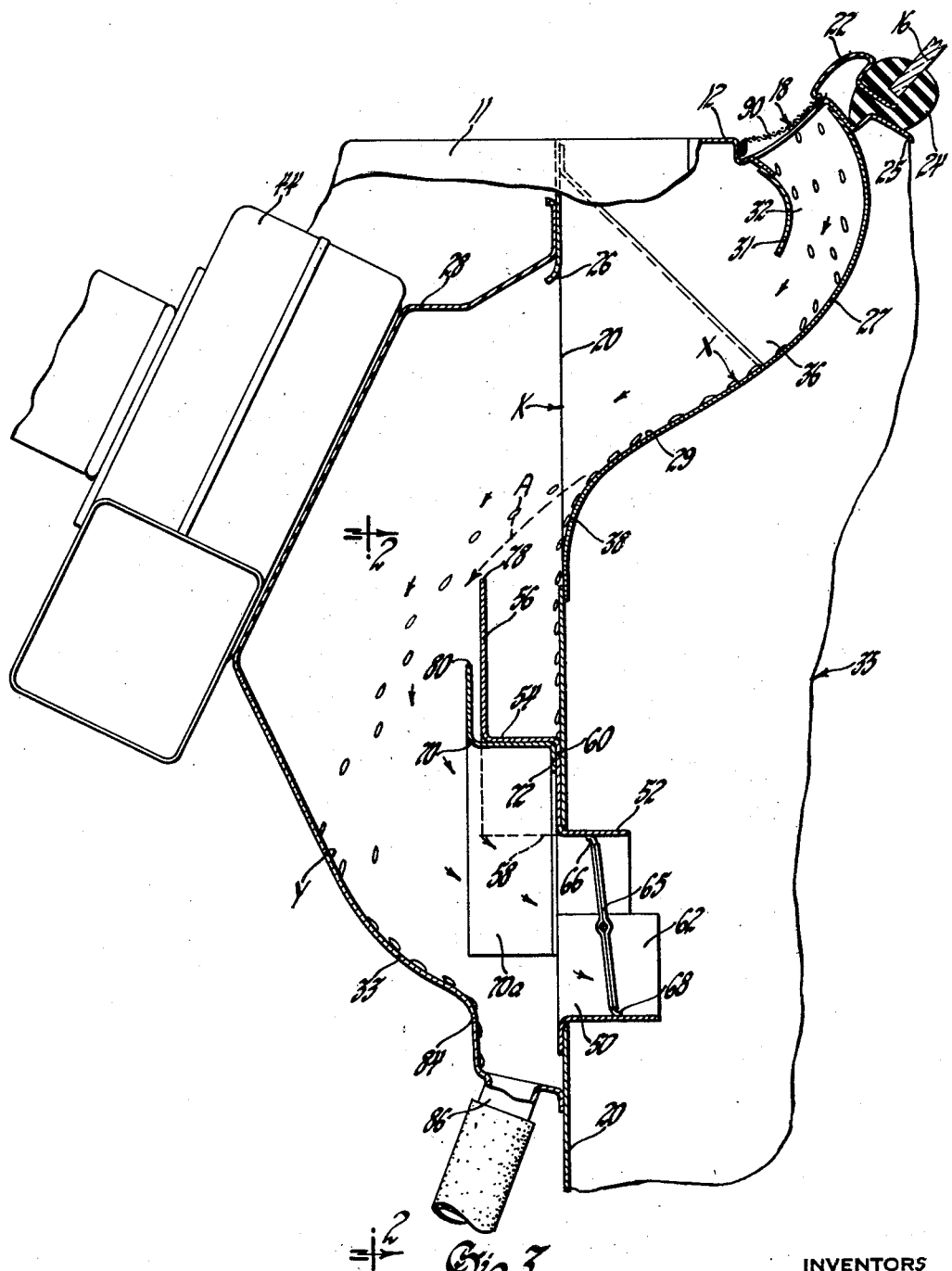

Sept. 24, 1957 J. D. LESLIE ET AL 2,807,201
VEHICLE BODY WITH BUILT-IN VENTILATION SYSTEM
Filed Nov. 18, 1953 3 Sheets-Sheet 3

INVENTORS
Lloyd E. Muller, James D. Leslie &
BY Robert M. Fox
C. H. Ritke
ATTORNEY United States Patent Office 2,807,201
Patented Sept. 24, 1957

2,807,201
VEHICLE BODY WITH BUILT-IN VENTILATION SYSTEM

James D. Leslie, Birmingham, Robert M. Fox, Detroit, and Lloyd E. Muller, Flint, Mich., assignors to General Motors Corporation, Detroit, Mich., a corporation of Delaware Application November 18, 1953, Serial No. 392,806

10 Claims. (Cl. 98—2)

This invention relates to ventilation systems and more particularly to built-in ventilation systems for automotive vehicles having cowls provided with openings in advance of the windshields for supplying outside air under controlled conditions.

Automobile bodies, ordinarily depend upon the chassis frames for supporting them in such a way as to give rigidity and strength; and ventilation systems are usually supplied as separate devices which are installed after the bodies are complete. Obviously, it is advantageous to provide a built-in ventilation system—i. e.—a system of parts which are formed integral with the body structure to perform the dual functions of supplying structural strength and ensuring adequate air ducts while retaining compactness. This compactness is particularly important within the cowls of automobiles where space is much needed and economized for the use, installation and service of accessories and vehicle controls.

Experience has shown that closed automobile bodies, during inclement weather, have heretofore not been supplied with adequate ventilation and much effort has been expended to increase the volume of air admitted under proper control particularly when the vehicle is under way. In order to increase the volume of air, it has been found necessary to increase the size of the inlet for the air as well as the velocity of the air. With such increases a difficulty has heretofore arisen in that water is admitted in greatly increased quantities, and although provision has been made in various forms to drain off this water, much of it has unavoidably been entrained in the air and carried into the vehicle body. Expedients such as baffles, passageways and troughs, in combination and as used in devices prior to the present invention, have not proven successful under these circumstances. The greatly increased volume of air, with its proportionately larger amounts of entrained moisture, does not flow through such devices with laminar flow but with an attendant formation of eddy currents. These currents serve to keep the entrained moisture in suspension and adequate water separation has not been possible.

It has now been found, that by properly shaping an air duct with a suitable inlet or air scoop, a large quantity of air may be admitted to a vehicle body compartment without objectionable entrainment or continued suspension of water or moisture and such a duct may advantageously be built into the automobile body structure.

An important object of the present invention is to provide a vehicle body structure with built-in duct means having an air scoop or air inlet in the cowl near the base of the windshield and through which air may be forced into the passenger compartment and the duct means being compact yet out of the way with respect to mechanical elements such as windshield wiper mechanisms, radio and control devices.

Another object of the present invention is to provide an automotive ventilating system with air flow passages smoothly contoured to prevent the formation of eddy currents and yet capable of admitting air in large volume and at a high velocity without retaining water in suspension.

Another object is to provide an improved ventilation system for separating water by gravity and centrifugal force from air admitted through a cowl opening or air scoop.

To these ends a feature of the present invention is a vehicle body structure with air scoop means extending across the cowl and communicating with two forwardly and downwardly extending duct portions associated with the fire wall.

Another feature of the invention is a vehicle body structure having air scoop means extending along and adjacent the base of the vehicle windshield as an inlet to two downwardly curved and forwardly extended duct portions and to an intermediate duct portion by means of which the extended duct portions communicate.

Another feature is an S-shaped duct of sheet metal construction, the duct having interior walls of downwardly curved contours.

Another feature of the invention comprises an S-shaped duct with curved interior contours having a drain device or trough located beneath the path of laminar flow as determined by the duct.

Still another feature of the invention comprises a curved duct with two troughs or drain devices located one above the other and attached to an interior convex wall of the duct beneath the path of laminar flow as determined by the upper portion of the duct.

These and other important features of the invention will now be described in detail in the specification and then pointed out more particularly in the appended claims.

In the drawings:

Fig. 1 is a plan view of the front half of an automotive vehicle, parts being broken away for clarity of illustration;

Fig. 2 is a sectional view taken along the line 2—2 of Fig. 3;

Fig. 3 is an enlarged view partially in section taken along the line 3—3 of Fig. 1 and with a fan housing added.

Figure 4:
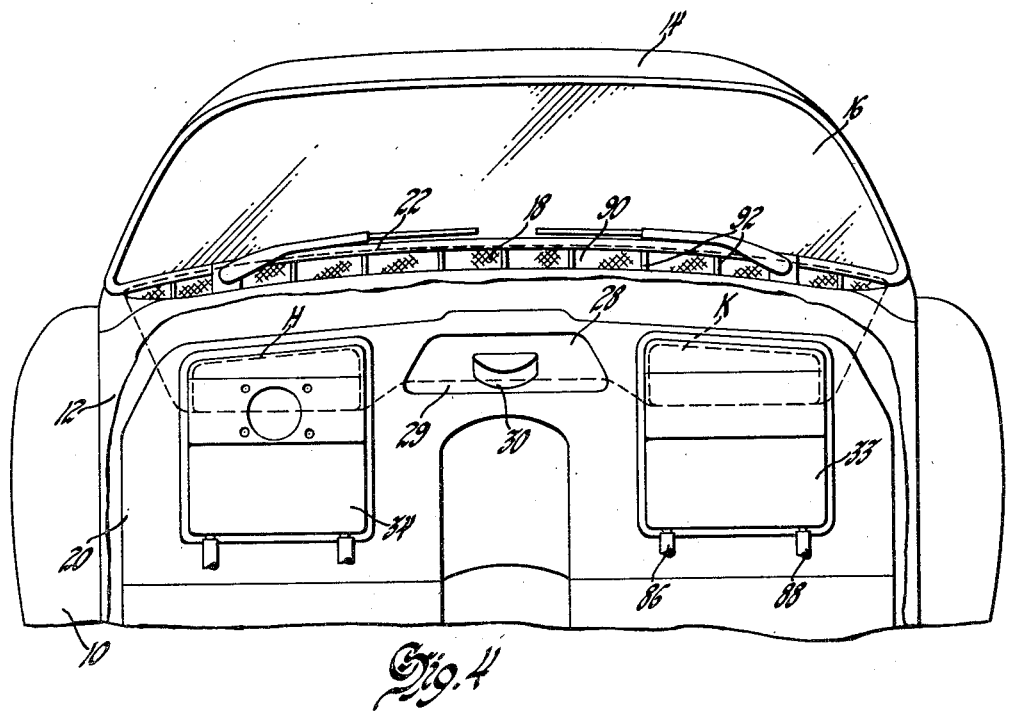
Fig. 4 is an enlarged view taken along the line 4—4 in Fig. 1 with air fans omitted.

The invention is illustrated as embodied in an automotive vehicle 10 having a hood 11, a cowl 12, a top 14, a windshield 16 and an elongated and screened opening 18 extending substantially across the width of the cowl and near the base of the windshield.

In the present instance the vehicle 10 is provided with a fire wall 20 which forms an integral part of the duct system within the cowl 12. A trim strip 22 is attached to the upper portion of the cowl and co-operates with a rubber sealing strip 24 and a cowl flange 25 for retaining the lower edge of the windshield 16. The wall 20 is made with two elongated openings H and K (Fig. 4) and the margin of the wall 20 as it defines the upper side of each of these openings is formed into a curved lip 26 (Fig. 3) to aid in promoting a smooth flow of air as required. Extending upwardly and rearwardly and then forwardly from an intermediate portion of the fire wall 20 is a smoothly curved wall portion 27 which extends substantially across the width of the cowl 12. The upper edge of the wall portion 27 terminates at the rear edge of the opening 18 adjacent the trim strip 22 thereby placing the screened inlet 18 in the air stream when the vehicle 10 is under way.

An intermediate portion of the fire wall 20 is formed into a depression 28 with a downwardly and forwardly inclined wall 29 for supporting a windshield wiper motor 30 (Fig. 4). The shaft of this motor is not shown but it may extend downwardly into the passenger compartment for connection to the wiper transmissions.

Concentric with and spaced from the upper part of the curved wall portion 27 and attached to the cowl 12 is a depending plate 31 (Fig. 3). The portion 27 and plate 31 co-operate to define a wide throat passage 32 through which air may enter the system and this structure is adapted to function as an air scoop as will be understood.

As the throat passage 32 extends substantially the full width of the cowl 12 and windshield 16, it communicates with two downwardly extending portions or ducts 33 and 34 and an intermediate duct portion 36 arranged over the recess 28 joining the two ducts as shown in dotted lines in Fig. 4.

The curved wall portion 27 presents an upwardly facing surface X leading downwardly to the interior of each of the ducts 33 and 34. It is smoothly contoured to form a continuous curve substantially merging with the fire wall 20.

It will be appreciated that the ducts 33 and 34 may be identical in construction. Also, each of them may be provided with a fan for ventilating or heating purposes or such fan may be omitted. Fig. 1 shows a fan housing 42 located on the right-hand duct 34 and Fig. 3 shows a fan housing 44 so located on the left-hand duct 33 that the inlet of each must necessarily draw air upwardly and forwardly from the duct 33 or 34. The fan housing 44 has been omitted from the duct 33 in Fig. 1 in order to simplify illustration of the duct per se.

Each of the forward walls of the ducts 33 and 34 are made to bulge forwardly or toward the front end of the vehicle in order to cause each duct to define an S-shaped passage leading downwardly from the elongated air inlet 18 and terminating at the lowest end so as to communicate with the vehicle interior or passenger compartment 35.

As seen in Fig. 3, an outlet opening 50 for duct 33 is provided in the fire wall near the lower end thereof. A short duct structure 52 is attached to the fire wall in line with opening 50 and forms an extension of duct 33. The upper portion of structure 52 comprises a substantially horizontal trough 54 having an upstanding lip 56, a depending leg portion 58 and an upwardly directed leg portion 58a. The metal structure 52 has an intermediate portion 60 in which the duct portion thereof is formed and from which vertical flanges 62 and 64 (Fig. 2) are made for convenient attachment to the side margins defining the opening 50 formed in the fire wall 20. It will be understood that all joinder of the sheet metal parts may be by welding or otherwise. Pivoted within the opening 50 is a valve 65 having flexible edges 66 and 68 and by means of which admission of air from the duct 33 to the vehicle interior 35 may be regulated.

A second drain device in the form of an inverted U-shaped trough 70 is provided beneath the trough 54 and it is attached to the metal structure 52 by means of a flange 72. Depending legs 70a and 70b extend from the opposite ends of the trough 70 and terminate a short distance above the bottom of the duct 33.

It will be noted that the top edge 78 of the trough 54 is located beneath the path of laminar flow of the air as determined by the upper portion of the duct 33. A dot-and-dash line A indicates approximately the lower boundary of the path of air which would flow from the inlet 18 and over the inclined portion or surface X of the wall portion 27.

It is to be noted also, that the upper edge 80 of the trough 70 extends into the duct 33 a distance slightly beyond the lip 78 of the trough 54.

The lower horizontal portion of the duct 33 is provided with a trough portion 84 to each end of which is attached a hose connection 86 or 88.

The elongated air inlet opening 18 running along the base of the windshield 16 is provided with a screen 90 to exclude foreign matter and also with spaced reinforcing members 92 which may be ornamental in character.

When the vehicle 10 is operating at low speeds, considerable air pressure develops in the vicinity of the screened opening 18 and air is forced downwardly and forwardly through the throat passage 32 and into the ducts 33, 34 and 36. As this occurs, entrained moisture because of its greater weight and partially because of the greater centrifugal force acting upon it is forced into contact with the upwardly facing and inclined surface X of the wall portion 27 and this moisture is caused to form into drops and to run down into the trough 54 of a duct 33 or 34 from which it is drained by means of a depending leg 58 into the trough portion 84 and subsequently into and through the hose connections 86 and 88 for disposal. The air passes over the lip 56 without the formation of eddy currents because of the position of the lip edge 78 with respect to the surface 29 and then downwardly and is guided by the inner surface Y of the lower part of the duct 33 or 34. Any moisture escaping separation at the surface X and which may pass over the edge 18 of the trough 54 is again subjected to gravity and centrifugal force and, as a consequence, such residual moisture 34 and into the trough portion 84 for disposal. It, therefore, is seen that whether the valve 65 is open or closed, all objectionable moisture is efficiently removed. With the valve 65 open, a large quantity of air may be admitted to the vehicle interior 35 at either low or high vehicle speeds and the moisture is removed almost entirely by means of the trough 54 because of the weight and centrifugal action and any possible remaining and objectionable entrained moisture is definitely removed by the co-operative effect of the surface Y and the trough portion 84.

At some speeds it may happen that a slight eddy current is generated in the vicinity of the lip 56 in which event some moisture will run down the outside of that lip and will be deposited in the trough 70 from which it may run out the ends thereof and into the trough portion 84.

From the above it may be seen that we have provided effective means by which water, in a primary action, is separated from the air because of its greater weight and by centrifugal impingement upon the surface X at low, high and intermediate speeds and thereby substantially completely removed from the air before it enters the passenger compartment of the vehicle. It may also be seen that, at any speeds, any liquid retained by the air passing over the lip edge 78 is efficiently removed, in a secondary action, by centrifugal force as it impinges upon the surface Y. This double treatment or action is accomplished without cutting down the desired large volume or velocity of the air required for proper ventilation. When the speed of the air and water mixture entering the duct system is so high that the action of gravity and centrifugal force is insufficient to cause the water to impinge on the surface 27, then the water will pass over the trough edges 78 and 80. At such speed, however, the water, because of its momentum, impinges on surface Y.

We claim:

1. A ventilating system for an automotive vehicle having a windshield, said system comprising an S-shaped duct with curved contours, an inlet opening in the top end of said duct and located forward of said windshield, an outlet opening in the bottom end of said duct, a drain device within said duct, said drain device having an upwardly extending lip for diverting moisture, the top edge of said lip being in an intermediate zone of the duct between said ends and beneath the path of laminar flow as determined by the upper portion of the duct, and the arrangement being such that flow to said outlet opening is smooth and around said drain device.

2. A ventilating system for an automotive vehicle having a windshield, said system comprising an S-shaped duct leading down and located forwardly of said windshield, an opening in each end of the duct, and a drain device including an upwardly extending lip located within said duct on a convex interior wall thereof and beneath the path of laminar flow as determined by the upper portion of the duct.

3. A ventilating system for an automotive vehicle having a windshield and a passenger compartment, said system comprising an S-shaped duct with downwardly extending curved contours, an opening in the upper end of said duct arranged forwardly of said windshield, an outlet opening in the lower portion of said duct and leading into said passenger compartment, a drain device within said duct attached to the interior and rear wall thereof, the top of said drain device being beneath the path of laminar flow as determined by the upper portion of the duct, and a fan housing attached to the outer and forward wall of said duct with its inlet directed upwardly therefrom.

4. A ventilating system for an automotive vehicle having a windshield, a cowl and a passenger compartment, said system comprising a sheet metal structure having two S-shaped ducts leading downwardly throughout substantially their entire lengths into said cowl, an elongated opening in said structure extending along the base of the vehicle windshield and transverse to the said ducts, an outlet opening near the lower end of each of said ducts and leading into said passenger compartment, a communicating passage in said structure extending beneath said elongated opening and connecting the said ducts near the upper ends thereof, a drain device comprising a trough having an upwardly extending lip located within an intermediate zone of at least one of said ducts beneath the path of laminar flow as determined by an upper portion of the said one duct.

5. A ventilating system for an automotive vehicle having a windshield, said system comprising an S-shaped duct located forwardly and below said windshield, an opening at each end of the duct for admission and discharge of air, a first drain device comprising a trough located within said duct immediately beneath the path of laminar flow as determined by the upper portion of the duct, and a second drain device arranged beneath the first drain device for removing moisture which may be entrained in said air and pass over said first drain device.

6. A ventilating system for an automotive vehicle comprising a downwardly extending S-shaped duct, an opening in each end of the duct, one of said openings being positioned to receive air by ram effect, two drain devices located one above the other within said duct and beneath the path of laminar flow as determined by the upper portion of the duct, and each of said devices including a lip for trapping moisture.

7. A ventilating system for an automotive vehicle having a windshield and a passenger compartment, said system comprising an S-shaped duct with curved contours extending downwardly, said duct being fabricated of sheet metal, an elongated and screened opening at the upper end of said duct extending along the base of the said windshield, an outlet opening leading from the bottom end of said duct and communicating with said passenger compartment, a valve for said outlet opening, two troughs arranged one above the other on the wall of said duct and above said outlet opening, the top edge of the upper of said troughs being beneath the path of laminar flow as determined by the upper portion of the duct, and the lip of the lower trough extending into said duct forwardly of the said upper trough.

8. A ventilating system for an automotive vehicle having a windshield and a passenger compartment, said system comprising two S-shaped ducts with curved contours extending downwardly, a horizontal duct through which upper portions of said ducts communicate, an inlet opening extending along the base of said windshield and communicating with said ducts, an outlet opening in the bottom end of each of said two ducts, means associated with each of said outlet openings for conveying air to said compartment, two troughs arranged one above the other on the interior convex and rear side of each of said two ducts, said troughs having upwardly extending and spaced lips located beneath the path of laminar flow as determined by the upper portion of each of the two ducts.

9. A vehicle body structure comprising a cowl, a windshield extending upwardly from said cowl, a fire wall and duct means having an outside air inlet in said cowl forward of said windshield and rearward of said fire wall and defining an air passage of curved interior wall surface contour, said passage extending forwardly through said fire wall and continuing to a discharge opening leading rearwardly through said fire wall, and all intermediate portions of said duct means extending downwardly in defining the length of said passage.

10. A vehicle body structure comprising a cowl, a windshield extending upwardly from said cowl, a fire wall and duct means having an outside air inlet in said cowl forward of said windshield, said means defining a passage extending generally downward and curved to incline forwardly from said inlet and then rearwardly to a discharge opening leading through said fire wall.

References Cited in the file of this patent

UNITED STATES PATENTS

| | | |
|---|---|---|
| 1,643,966 | Swartwout | Oct. 4, 1927 |
| 2,011,840 | Arnold et al. | Aug. 20, 1935 |
| 2,045,578 | Buford | June 30, 1936 |
| 2,205,605 | Stewart | June 25, 1940 |
| 2,235,642 | Lintern et al. | Mar. 18, 1941 |
| 2,355,151 | Findley | Aug. 8, 1944 |
| 2,510,790 | Arnold | June 6, 1950 |
| 2,613,985 | Ulrich | Oct. 14, 1952 |

FOREIGN PATENTS

| | | |
|---|---|---|
| 457,964 | Great Britain | Dec. 9, 1936 |